United States Patent
Hasegawa et al.

(10) Patent No.: US 6,696,168 B2
(45) Date of Patent: Feb. 24, 2004

(54) ALUMINUM-BASE COMPOSITE BEARING MATERIAL AND METHOD OF PRODUCING THE SAME

(75) Inventors: Yasukuni Hasegawa, Narashino (JP); Koue Ohkawa, Narashino (JP); Hiroyuki Sugawara, Narashino (JP)

(73) Assignee: NDC Company Ltd., Chiba (JP)

( * ) Notice: Subject to any disclaimer, the term of this patent is extended or adjusted under 35 U.S.C. 154(b) by 94 days.

(21) Appl. No.: 10/133,433

(22) Filed: Apr. 29, 2002

(65) Prior Publication Data

US 2003/0012972 A1 Jan. 16, 2003

(30) Foreign Application Priority Data

Apr. 27, 2001 (JP) ........................................ 2001-131474

(51) Int. Cl.$^7$ .............................. B22F 3/14; B22F 7/02; B22F 7/04; B32B 15/20; F16C 29/02
(52) U.S. Cl. ...................... 428/557; 428/653; 428/654; 428/933; 419/29; 419/43; 419/50; 419/55; 419/69; 384/910; 384/912
(58) Field of Search ................................ 428/557, 547, 428/653, 654, 933; 419/43, 29, 50, 55, 69; 384/910, 912

(56) References Cited

U.S. PATENT DOCUMENTS

| | | | | |
|---|---|---|---|---|
| 3,797,084 A | * | 3/1974 | Fedor et al. ................... | 419/2 |
| 4,069,369 A | | 1/1978 | Fedor et al. | |
| 4,121,928 A | * | 10/1978 | Mori .............................. | 419/3 |
| 4,365,995 A | * | 12/1982 | Mori .............................. | 419/6 |
| 4,734,967 A | * | 4/1988 | Bryda et al. ................... | 419/6 |
| 5,112,416 A | * | 5/1992 | Tanaka et al. ............... | 148/437 |
| 6,163,961 A | * | 12/2000 | McMeekin ............. | 29/898.056 |
| 6,596,671 B2 | * | 7/2003 | Whitney et al. ............ | 508/103 |

FOREIGN PATENT DOCUMENTS

| | | |
|---|---|---|
| JP | 49-45445 B2 | 12/1974 |
| JP | 52-20336 | 2/1977 |
| JP | 2502600 | 3/1996 |

* cited by examiner

Primary Examiner—John J. Zimmerman
Assistant Examiner—Jason L Savage
(74) Attorney, Agent, or Firm—Browdy and Neimark, P.L.L.C.

(57) ABSTRACT

A composite strip of compacted powders, which has a three layers structure, is continuously obtained by means of a rolling machine for powder compacting. The composite strip is sintered at a temperature of 460° C. to 550° C. to form a sintered composite strip. The sintered composite strip is continuously bonded by rolling to a steel strip. The bonded composite strip is optionally subjected to a heat treatment of heating at a temperature of 250° C. to 400° C. followed by heating to a temperature of 400° C. to 510° C., holding the strip under the temperature for not less than 30 seconds, and rapidly cooling down to 300° C. at a cooling rate of not lower than 50° C./minute, whereby obtaining a multi-layered composite material consisting of the steel strip, a sintered bonding layer, a sintered sliding layer and a sintered sacrificial layer. At least one selected from a low-melting-point element group of Sn, In and Pb is added to raw powders to be formed to surface layers of the sintered composite strip, which are the sintered bonding layer and the sintered sacrificial layer, in an amount of 0.4 to 5 mass % and 0.4 to 25 mass %, respectively.

9 Claims, 4 Drawing Sheets

ALUMINUM-BASE COMPOSITE BEARING MATERIAL AND METHOD OF PRODUCING THE SAME

BACKGROUND OF THE INVENTION

1. Field of the Invention

The present invention relates to a producing technique for a material of bearings incorporated in internal combustion engines for automobiles, marine vessels, agricultural machines, construction machines, etc. and of sliding bearings used in rotating or reciprocating sliding parts of general machines, and more particularly to an aluminum-base composite bearing material excellent in wear resistance property and anti-seizure property, and a method of producing the same.

2. Description of the Related Art

A conventional aluminum alloy bearing with a back metal is produced through a casting or a sintering process.

In the casting process, an aluminum alloy is continuously cast to form a strip material having a thickness of 15 to 20 mm and a constant width. The strip material is rolled and annealed repeatedly to have a thickness of about 1 mm. Thereafter, the strip material is integrally bonded to a steel strip by rolling to produce a bearing material. It is noted that, according to the casting process, in the case where Pb, a solid lubricant, which is not soluble in aluminum, is added to an aluminum alloy in an amount of not less than 5%, a melt of the aluminum alloy separates into two phases unless the casting temperature is not lower than 1000° C. While this is one example, in casting, process conditions considerably vary depending on additive alloy components, and in some cases, there is a case that a production is impossible.

On the other hand, in the production of an aluminum-base composite bearing material by the powder metallurgical process, a continuous strip material consisting of a bonding layer, an alloy layer and a sacrificial layer is formed by means of a rolling machine for powder compacting, and after sintering, the material is integrally bonded to a steel strip as a back metal by rolling as disclosed in JP-B2-49-45445 and JP-B2-2502600.

According to another example of the powder metallurgical process as disclosed in JP-A-52-20336, there is proposed a method that an aluminum-base powder is directly spread on a back metal followed by rolling, sintering and again rolling.

The present invention relates to an improvement in the method for producing an aluminum-base sliding bearing material by the above powder metallurgical process.

Recently, there have been strong desires of performance improvement to sliding bearings used in rotating or reciprocating sliding parts in passenger cars and the like, that are long durability, maintenance free property and so on. This is a demand for a high quality material. The technology intended to be improved by the invention is a powder metallurgical method according to which an aluminum-base composite strip, having a three layers structure consisting of a bonding layer, a sliding layer and a sacrificial layer, is formed beforehand, and after sintering, both side edge sections thereof are trimmed to provide the sintered product with a predetermined width size so as to be in conformity with the width of a steel strip (back metal) to which the sintered product is bonded, and finally the sintered product is bonded to the steel strip by rolling.

In the methods disclosed in JP-B2-49-45445 and JP-B2-2502600, the moisture on the surface of each particle of the powder or various aluminum hydroxides vaporize to expand with temperature rising when sintering the powder. Most of the generated gas is released to the outside through zones of a molten low-melting-point metal as pathways in the sacrificial layer (surface layer) containing the dispersed low-melting-point metal. However, a part of the gas remains without release to produce blisters in the material, where the low-melting-point metal moves. Even after the rolling-bonding of the sintered material to the steel strip in a subsequent process, there has been often observed a phenomenon that collapsed blisters under a rolling-bonding pressure become material defects due to segregation of the low-melting-point metal at the collapsed blisters. In particular, a number of such material defects occur in spring and summer seasons characterized by high temperature and high humidity which are weather characteristics of Japan.

In a sliding bearing with such material defects (i.e. blisters), contrary to the required bearing performance, when using a bearing, there have been often occurred unfavorable accidents such as delamination of material, abnormal wear and seizure at blisters. Further, in the production process for bearings, it is necessary to remove material defects detectable from an appearance, so that an improvement in productivity is excessively prevented.

SUMMARY OF THE INVENTION

The invention has been proposed under the above background.

In view of the fact that, when heating and sintering the above mentioned aluminum-base composite strip having a three layers structure consisting of the bonding layer, the sliding layer and the sacrificial layer, gases such as $H_2O$, $H_2$, and $O_2$ are generated in the aluminum-base composite strip, a primary object of the invention is to restrain occurrence of blisters in the strip by allowing the gases generated in the strip to easily release not only from the sacrificial layer but also from the bonding layer whereby improving the quality of the product strip.

Under the object, the present inventors have proposed the following method for producing an aluminum-base composite bearing material made by powder sintering.

The objective aluminum-base composite bearing material made by powder sintering consists of an aluminum-base metallic layer made by powder sintering and a back metal, the aluminum-base metallic layer consisting of a bonding layer, a sliding layer and a sacrificial layer, wherein the sintered aluminum-base powder layer is bonded by rolling to the back metal at the side of the bonding layer whereby the back metal, the bonding layer, the sliding layer and the sacrificial layer are arranged in this order.

According to the invention, the aluminum-base composite bearing material made by powder sintering is produced through the following eight steps:

(a) preparing a first powder to be formed to the bonding layer, which consists of 0.4 to 5 mass % in total of at least one selected from a first element group of Sn, In and Pb, from zero to 2 mass % in total of at least one selected from a second element group of Si, Mn, Ni, Cr, Zn, Fe, Zr, Ti and Sb, from zero to 1 mass % in total of at least one selected from a third element group of Cu and Mg, and the balance of Al and incidental impurities;

(b) preparing a second powder to be formed to the sliding layer, which consists of 2 to 20 mass % in total of at least one selected from the first element group, 2 to 8 mass % in total of at least one selected from the second element group, 0.5 to 2 mass % in total of at least one selected from the third element group, and the balance of Al and incidental impurities;

(c) preparing a third powder to be formed to the sacrificial layer, which consists of 0.4 to 25 mass % in total of at least one selected from the first element group, from zero to 4 mass % in total of at least one selected from the second element group, from zero to 1 mass % in total of at least one selected from the third element group, and the balance of Al and incidental impurities;

(d) continuously forming an elongated multi-layered body of three powder layers so that the second powder is positioned between the first and second powders, whereby obtaining a first to third powder layers;

(e) continuously forming a composite strip of compacted powders, which has a three layers structure, by continuously feeding the elongated multi-layered body into a rolling machine for powder compacting to press and form it;

(f) producing a sintered composite strip by heating the continuous composite strip of compacted powders to a temperature of 460° C. to 550° C. to continuously sinter it;

(g) continuously laying the sintered composite strip on a steel strip to be the back metal, which is fed separately, so as to bring the first powder layer side of the sintered composite strip to contact with the steel strip, and feeding the combined strips into a rolling machine to continuously rolling-bond the sintered composite strip to the steel strip; and (h) subjecting the thus obtained rolling-bonded composite strip to a heat treatment of heating it to a temperature of 400° C. to 510° C. and holding it under the temperature for not less than 30 seconds, and of rapidly cooling it down to 300° C. at a cooling rate of not lower than 50° C./minute.

By the above steps, a multi-layered composite material having a layered structure can be obtained, which consists of the back metal of the steel strip, the bonding layer of the sintered first powder layer, the sliding layer of the sintered second powder layer and the sacrificial layer of the sintered third powder layer, these being arranged in this order.

It is preferable that the rolling-bonded composite strip is subjected to a heat treatment at a temperature of 250° C. to 400° C. prior to the step (h).

A preferred embodiment of heat treatment conditions for the continuous composite strip of compacted powders in the step (f) is as follows:

the temperature-elevating rate to a temperature of 460° C. to 550° C.: 20° C. to 50° C./hour, and the holding time at the elevated temperature: 2 to 16 hours.

Further, according to a preferred embodiment, the composite strip having a three layers structure obtained in the step (e) has a total thickness of 1200 to 2500 μm, a thickness of the first powder layer to be formed to the bonding layer of 300 to 600 μm, and a thickness of the third powder layer to be formed to the sacrificial layer of 100 to 300 μm.

According to a second aspect of the invention, there is provided an aluminum-base composite bearing material consisting of an aluminum-base metallic layer made by powder sintering and a back metal, wherein the aluminum-base metallic layer consists of a bonding layer, a sliding layer and a sacrificial layer which are arranged in this order, and wherein the aluminum-base metallic layer is bonded by rolling to a steel strip to be the back metal at the side of the bonding layer. The aluminum-base composite bearing material is characterized by that:

(a) the bonding layer is a sintered powder layer consisting of 0.4 to 5 mass % in total of at least one selected from a first element group of Sn, In and Pb, from zero to 2 mass % in total of at least one selected from a second element group of Si, Mn, Ni, Cr, Zn, Fe, Zr, Ti and Sb, from zero to 1 mass % in total of at least one selected from a third element group of Cu and Mg, and the balance of Al and incidental impurities;

(b) the sliding layer is a sintered powder layer consisting of 2 to 20 mass % in total of at least one selected from the first element group, 2 to 8 mass % in total of at least one selected from the second element group, 0.5 to 2 mass % in total of at least one selected from the third element group, and the balance of Al and incidental impurities;

(c) the sacrificial layer is a sintered powder layer consisting of 0.4 to 25 mass % in total of at least one selected from the first element group, from zero to 4 mass % in total of at least one selected from the second element group, from zero to 1 mass % in total of at least one selected from the third element group, and the balance of Al and incidental impurities; and (d) the aluminum-base metallic layer consisting of the bonding layer, the sliding layer and the sacrificial layer is a sintered composite strip which is formed prior to the rolling-bonding to the steel strip, and the aluminum-base composite bearing material is, as a whole, subjected to a heat treatment after the sintered composite strip is bonded by rolling to the steel strip.

According to a third aspect of the invention, there is provided an aluminum-base composite bearing material, wherein the sacrificial layer of the above aluminum-base composite bearing material is removed by machining.

DETAILED DESCRIPTION OF THE INVENTION

The bonding layer (the first powder layer), which is one constituent element of the aluminum-base composite bearing material of the invention, can enhance the bonding strength to the steel strip between the steel strip and the sliding layer (the second powder layer) when rolling-bonding of the sintered composite strip to the steel strip in a rolling machine. On the other hand, supposed that only the sliding layer (the second powder layer) is bonded to the steel strip, the attempt of the press-forming (powder compacting) of only the second powder in a rolling machine for powder compacting will fail to keep a continuous strip form by powder compacting in the case of only the second powder consisting of a hard and less ductile aluminum-base powder. Thus, in the present invention, a composite strip of compacted powders having a three layers structure (sandwich structure) has been used wherein comparatively soft and ductile aluminum-base powders (the first and third powders) are used as the bonding layer (the first powder layer) and the sacrificial layer (the third powder layer).

Elements of the first element group contained in the first powder forming the bonding layer are low-melting-point metals and the amount proportion thereof is determined to be from 0.4 to 5 mass % in total of at least one selected from the group of Sn, In and Pb. When the amount proportion is less than 0.4 mass %, there will be no effect of restraining the occurrence of blisters caused by the gases generated in the above powder. On the other hand, when the amount proportion exceeds 5 mass %, the bonding strength at the contact interface is deteriorated due to concentration of the low-melting-point metals at the contact interface between the steel and the bonding layer when rolling-bonding of the sintered composite strip to the steel strip by a rolling machine, or in a subsequent heat treatment process.

According to one preferable embodiment of the first powder, an aluminum-base powder mixture is used, wherein single element powders or an alloy powder consisting of two or more elements is mixed with an aluminum powder, in order to easily make pathways in the bonding layer (the first powder layer) for releasing gases generated in the powder to the outside.

According to a further preferable embodiment of the first powder, the mixing amount of Pb and/or In is 1% or less in total. This is because no Pb dissolves in aluminum and steel and the bonding strength between the sintered composite strip and the steel strip is lowered by concentration of Pb at the contact interface between the sintered composite strip and the steel strip in the heat treatment process after the rolling-bonding of both materials.

In relation to the mixing amount of the first element group contained in the first powder forming the bonding layer, there exist a first peak of gas generation at a temperature of 100° C. to 200° C. and a second peak of gas generation at a temperature of 400° C. to 550° C. when the relationship between the heating temperature at sintering powder and the amount of gases generated in the sintered material is confirmed by a test. The first peak is a phenomenon of gas generation at a low temperature, wherein gases are generated owing to the moisture attached onto the surface of the powder particles and the decomposition of hydroxides. The second peak is a phenomenon of gas generation owing to the decomposition of several kinds of alumina hydrates which have formed on the surface of the aluminum powder particles.

A primary cause of the phenomenon of blister occurrence in the conventional materials is that, at the sintering step before the rolling-bonding of the sintered composite strip to the steel strip, an expansion of the sliding layer occurs at the position near to the bonding layer through which gases are difficult to release and then the expansion pushes the bonding layer to lift up the surface of the bonding layer. In the case that the sintering at the sintering step is not sufficient, breakage of the sintered composite strip occurs at the successive step of the rolling-bonding, so that the sintering should be carried out at a sintering temperature of 460° C. to 550° C. for a sufficient period of time.

Moreover, since a rapid elevation of the temperature at the sintering generates an expansion of the sintered material, it is necessary to heat it gradually at a temperature-elevating rate of 20 to 50° C./hour.

During the process, at the time of the first peak of gas generation, the sintering of the aluminum-base composite strip made by powder compacting, which is a target of the sintering, does not yet proceed, and each powder particle made by powder compacting is stretched in the rolling direction at powder compacting to form a flat shape and is pressed each other, but there exist fine voids at the interfaces among the powder particles. Therefore, the gases generated in the sintered material are released through the fine voids into outside the sintered material.

At the temperature zone corresponding to the second peak of gas generation, the sintering among the powder particles begins to advance and pathways for gas release among the powder particles are gradually blocked. Moreover, with the elevation of the temperature, the aluminum base in the powder particles becomes soft and expansion of the sintered material tends to occur. The gases generated in the sintered material cubically expand with the elevation of the temperature, and thus inner gas pressure increases. At that time, when a low-melting-point metal in the bonding layer (the first powder layer) similar to the sacrificial layer (the third powder layer) is melt and cubically expands to be discharged as sweat (indicating a sweaty state) onto the surface of the sintered material, the discharging pathway becomes a pathway of gas release. Alternatively, the gases are discharged together with the low-melting-point metal toward the surface of the sintered material. For obtaining this effect, both of the sacrificial layer (the third powder layer) and the bonding layer (the first powder layer) should contain at least 0.4 mass % in total of at least one selected from a first element group of Sn, In and Pb (the amount of a single element in the case of a single element, and total amount in the case of two or more elements).

Moreover, for enhancing the strength of the bonding layer (the first powder layer), at least one selected from a second element group of Si, Mn, Ni, Cr, Zn, Fe, Zr, Ti and Sb may be added to the bonding layer (the first powder layer) in an amount of only 0 to 2 mass % in total. The load carrying capacity of a sliding bearing mainly depends on the load carrying capacity of the sliding layer which is a top layer but is also affected to a large extent by the fatigue strength of the bonding layer which is a base layer. In this sense, for enhancing the load carrying capacity which is one performance required of a sliding bearing, it is preferred to add a large amount of the second element group, but in the present invention, the maximum adding amount of the second element group to the bonding layer is limited to not more than 2 mass % for the following reasons.

When the second element group is added in an amount exceeding 2 mass %, the fatigue strength is enhanced but the material becomes hard. (1) When a composite strip of compacted powders is subjected to powder compacting in a rolling machine for powder compacting, the sacrificial layer and the bonding layer of a hard and not ductile material cannot maintain the shape at the powder compacting by rolling with holding the sliding layer with soft aluminum alloys at both sides of the layer. Moreover, (2) at the rolling-bonding of the sintered composite strip to the steel strip (back metal) in a later step, the elongation of the bonding layer adjacent to the steel strip is insufficient to result in a weak bonding, or in some case, part of the sintered composite strip peels off the steel strip after the rolling-bonding.

In order to enhance the bonding between the sintered composite strip and the steel strip (back metal), it is necessary to expose a lot of fresh surfaces by destroying aluminum-oxidized layer in the surface (contact interface) of the bonding layer adjacent to the steel strip, and the reduction ratio of the bonding layer material should be at least 50% at the rolling-bonding. At that time, when the elongation of the bonding layer material is insufficient, material breakage occurs at the rolling-bonding and thus, the bonding becomes impossible.

To the bonding layer may be added at least one of the third element group of Cu and Mg in an amount of only 0 to 1 mass % in total. The third element group includes additive elements which exhibit an effect especially through the heat treatment described in the claims, and they enhance the fatigue strength of the bonding layer. With regard to the aluminum-base composite material made by power sintering, the sacrificial layer has been removed by machining at the time when the material is used as a sliding bearing, and the sintered material layer on the steel strip (back metal) consists of the bonding layer and the sliding layer. Recently, automobiles and general machines are miniaturized and become of high output power, and therefore, a sliding bearing resistant to a high specific load is required. With regard to the enhancement of fatigue strength, it is natural that the strength depends on the fatigue strength of the sliding layer which is a surface layer after the removal of the sacrificial layer, but the strength of the bonding layer which is a base layer also participates with. At the rolling-bonding, Cu and Mg do not so contribute to the decrease of elongation and the increase of hardness but are the elements enhancing the material hardness and strength through a final heat treatment. The mixing amount is suitably from 0 to 1 mass %. When the amount exceeds 1 mass %, the production of the aluminum-base composite material becomes difficult for the above reasons.

In addition, with regard to the second and third element groups, an aluminum alloy powder alloyed beforehand is more preferably used in order to prevent instability of the quality owing to unevenness of the components.

With regard to the sliding layer, at least one of the first element group is mixed in an amount of 2 to 20 mass % in total. The low-melting-point metal of the first element group insoluble or only slightly soluble in aluminum acts as a solid lubricant at sliding. When the mixing amount is less than 2 mass %, the effect is not observed, while when the mixing amount exceeds 20 mass %, the fatigue strength of the material (sliding layer) decreases to a large extent. Moreover, in the case that the mixing amount of the first element group exceeds 20 mass %, a lot of sweats (a sweaty state) occur on the surfaces of the sacrificial layer and bonding layer sides at obtaining the sintered composite strip by sintering the composite strip of compacted powders, and thus, the operation of removing the sweats becomes difficult.

In addition, the sliding layer is mixed with 2 to 8 mass % in total of at least one of the second element group. The second element group includes elements enhancing wear resistance property and fatigue resistance property of the material. The mixing amount of less than 2 mass % results in no above effects. When the amount exceeds 8 mass %, the material becomes hard and brittle, which invites deterioration of foreign matter embeddability and impact resistance at the time when foreign matter enters the sliding surface, and further, the material (sliding layer) becomes susceptible to fracture at the rolling-bonding of the sintered composite strip to the steel strip (back metal).

Furthermore, the sliding layer is mixed with only 0.5 to 2 mass % in total of at least one of the third element group. The amount of the third element group of less than 0.5 mass % does not contribute to the enhancement of the strength of aluminum matrix, and the strength and hardness of the material after the heat treatment are enhanced only a little, and such an amount does not contribute to the enhancement of wear resistance property and fatigue resistance property. When the amount of the third element group exceeds 2 mass %, the production becomes difficult owing to the occurrence of breakage and crack of the sintered material at the powder compacting by rolling and the rolling-bonding of the sintered composite strip to the steel strip (back metal) as well as the material becomes hard and brittle similar to the case of the second element group, and thereby, deterioration of foreign matter embeddability and impact resistance is invited at the time when foreign matter enters the sliding surface.

Next, the sacrificial layer is mixed with only 0.4 to 25 mass % in total of at least one of the first element group. The first element group is added for the purpose of achieving the effect of releasing the gases generated in the material without occurrence of blisters and the effect of maintaining the shape of the aluminum alloy composite layer at the rolling-bonding of the sintered composite strip to the steel strip (back metal). When the amount of the first element group is less than 0.4 mass %, the effect of gas release is not achieved as in the bonding layer, and thus a number of blisters occur on the surface after sintering.

Moreover, the sacrificial layer may be mixed with only 0 to 4 mass % in total of the second element group. Usually, when a sliding bearing is used at a sliding part, the bearing is frequently used in the form of cylindrical body (bush) whose inner surface is the sliding part. In this case, after a bush is pressed into a supporting housing, the sliding part is frequently cut by machining in order to increase processing precision. The aluminum-base composite bearing material of the invention is produced on condition that the surface part (sacrificial layer) is removed by machining. Namely, the sacrificial layer is necessary at the production of a sliding bearing by the powder metallurgical method but is removed when it is used as a product. However, at the press-forming of the multi-layered body having a three layers structure consisting of the first to third powders in a rolling machine for powder compacting, the sacrificial layer is unavoidably mixed into the sliding layer to some extent. The maximum mixing amount may be up to about 5%. Therefore, in consideration of the mixing into the sliding layer, it is necessary to impart a nature like the sliding layer even to the sacrificial layer, so that it is allowable to mix the second element group in an amount of up to 4 mass %. When the mixing amount of the second element group exceeds 4 mass %, in the production process, the shape cannot be maintained at the powder compacting by rolling with the concept of supporting the sliding layer with soft aluminum alloys at both sides. According to the same idea, at least one of the third element group is possible to be mixed in an amount of only 0 to 1 mass % in total.

The sacrificial layer consists of a mixture of the first element group, the second element group as an optional component, the third element group also as an optional component, and an aluminum alloy powder. Moreover, as in the cases of the bonding layer and the sliding layer, the second and third element groups are preferably subjected to alloying with aluminum before-hand in order to prevent the unevenness of the components. The first element group is preferably mixed with the sacrificial layer powder in the form of an element powder as described above in order to achieve the effect of gas release.

As described in the above, a composite strip of compacted powders having a three layers structure is manufactured by subjecting the three layers of the bonding layer, the sliding layer and the sacrificial layer to powder compacting in a rolling machine for powder compacting, as a multi-layered body having a sandwich structure wherein the sliding layer is positioned at the center. According to one preferable embodiment, the composite strip of compacted powders has a total thickness of 1200 to 2500 $\mu$m, in which the bonding layer has a thickness of of 300 to 600 μm, the sacrificial layer has a thickness of 100 to 300 μm, and the sliding layer has the remainder thickness. The thickness of each layer at the powder compacting by rolling is preferably within the above range in view of the shape maintenance and bonding strength at the rolling-bonding of the sintered composite strip to the steel strip which is a later process.

Furthermore, the composite strip of compacted powders having a three layers structure is sintered at a temperature of 460° C. to 550° C. At that time, when the heating temperature is lower than 460° C., the sintering is not realized, and when the temperature exceeds 550° C., the shape of the composite strip cannot be maintained.

The aluminum-base composite bearing material after sintering is trimmed at both side edge sections so as to be in conformity with the width of the steel strip, for the rolling-bonding of the sintered composite strip to the steel strip which is a later process. Moreover, sweats of the low-melting-point metals, which have poured off from the inside of the sintered composite strip to the bonding surface during sintering are removed previously by grinding such as surface grinding or brushing for achieving better bonding.

At the rolling-bonding of the sintered composite strip to the steel strip, the bonding surfaces of both materials are ground by means of a wire brush to form a fresh surface at each surface. Thereafter, the rolling-bonding is carried out at a reduction rate of the steel strip of 20 to 35% and a reduction rate of the sintered composite strip of 50 to 65%. At that time, it is important that the reduction rate of the aluminum-base sintered composite strip having a large extent of surface oxidation is larger than the reduction rate of the steel strip. As the reduction rate of the sintered composite strip is increased, the formed area of the fresh surface increases and better bonding between two materials is achieved, but when the reduction rate is 65% or more, the elongation of the aluminum-base sintered composite strip does not follow and thus, a breakage of the material is invited. On the other hand, when the reduction rate of the steel strip is increased, a precision at bending processing for imparting a curved shape to the product becomes difficult to secure. The reduction rate of both materials can be controlled by changing the diameter ratio of rolling rolls at each side.

After the rolling-bonding of the sintered composite strip to the steel strip, the resulting aluminum-base sintered composite material is subjected to a heat treatment of heating at a temperature of 250° C. to 400° C. to remove processing strain in the aluminum-base sintered material layer. When the temperature is lower than 250° C., the processing strain cannot be removed, while when the material is heated at a temperature exceeding 400° C., the effect of removing the strain is not improved and the bonding of the aluminum-base sintered material layer to the steel strip is rather decreased because the low-melting-point metals seep out as sweats onto the interface between the aluminum-base sintered material layer and the steel strip, whereby the production of the aluminum-base sintered composite material becomes difficult.

The material as heat-treated fully satisfies the properties of wear resistance, anti-seizure and fatigue resistance required for a sliding bearing but, for further enhancement of bearing performance, the material may be held at a temperature of 400 to 510° C. for 0.5 to 10 minutes and then rapidly cooled down to 300° C. at a cooling rate of not lower than 50° C./minute. When the treating temperature is lower than 400° C. and the holding time is less than 0.5 minute, the aluminum-base sintered material layer does not hardened and the strength is not enhanced, so that no improvement in wear resistance property and anti-seizure property is observed. When the temperature is higher than 510° C. and the holding time exceeds 10 minutes, an iron-aluminum metallic compound is formed at the interface between the sintered composite strip and the steel strip and the material becomes brittle, so that the aluminum-base sintered material layer tends to peel off at the actual use as a bearing.

The following will explain the mode for carrying out the invention.

Figure 1:
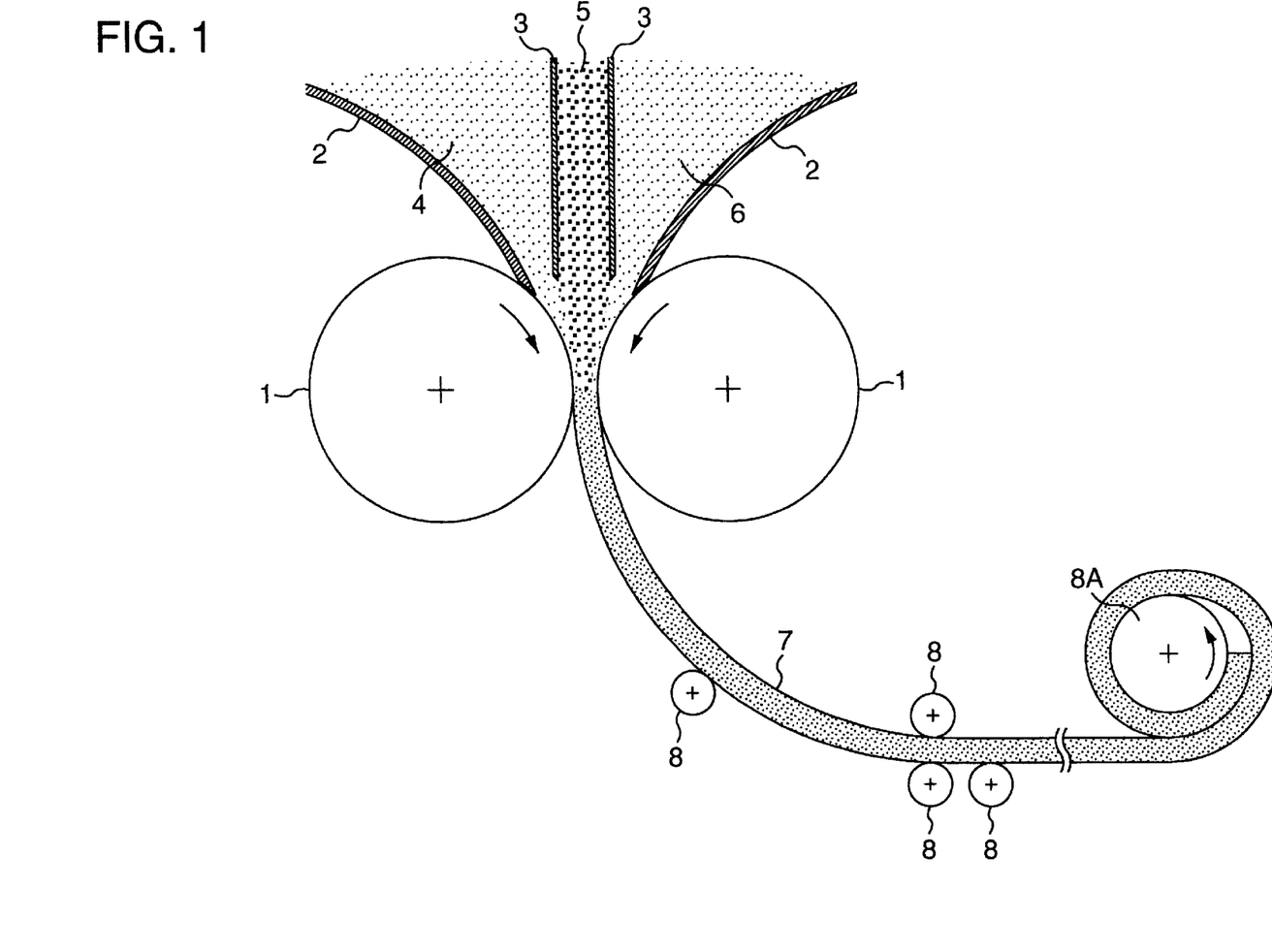
FIG. 1 shows a process of producing a composite strip of compacted powders, having a three layers structure, by continuously rolling three types of powder to form a multi-layered material in accordance with the invention.
Figure 2:
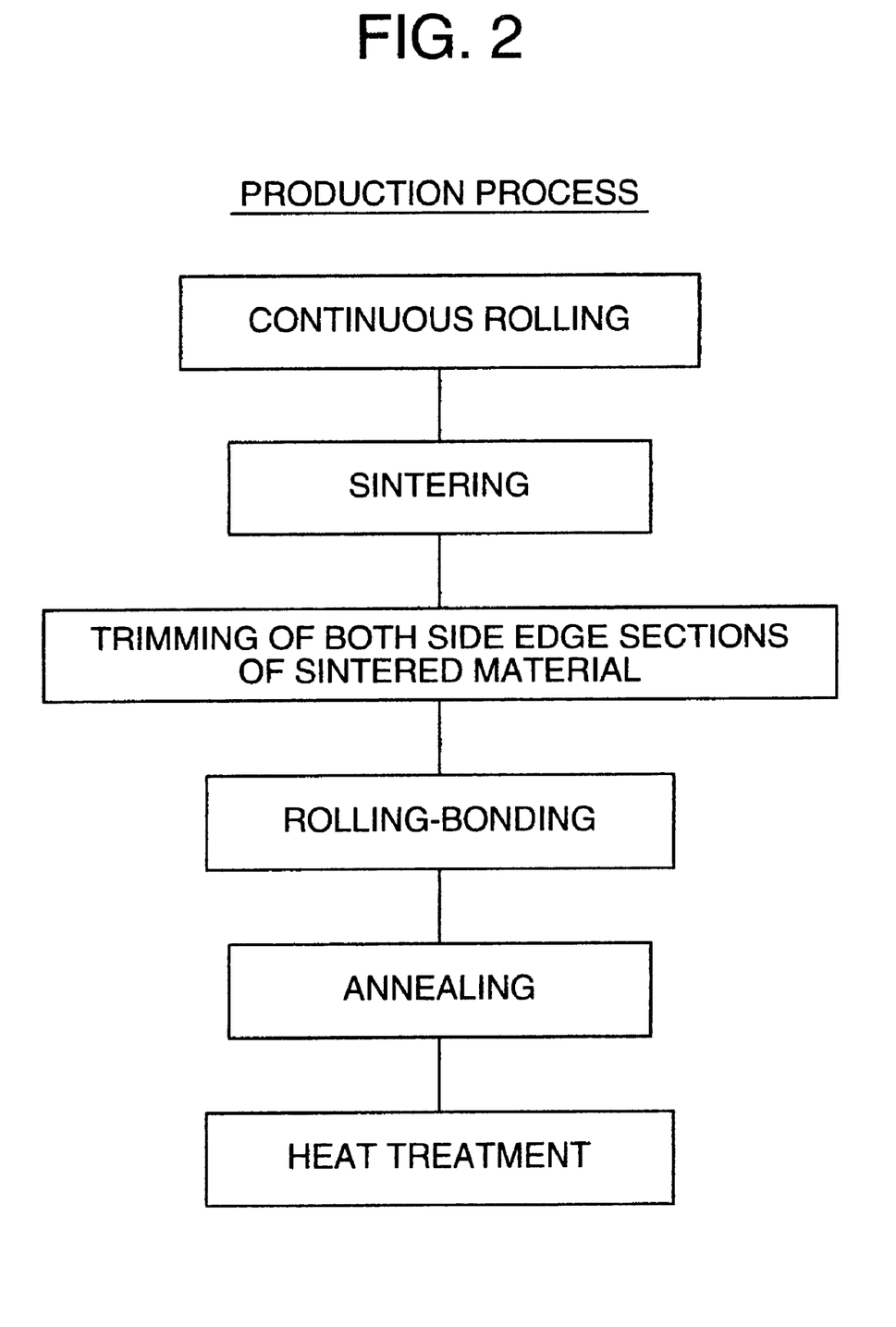
FIG. 2 is a flow chart showing the production process for an aluminum-base composite bearing material made by powder sintering in accordance with the invention.

FIG. 2 shows steps for production of the aluminum-base composite bearing material. Moreover, FIG. 1 shows a production manner of a composite strip of compacted powders (aluminum-base powder material) having a three layers structure by means of a rolling machine for powder compacting.

The rolling machine for powder compacting shown in FIG. 1 is equipped with one pair of rolls for powder compacting 1, 1 arranged parallel, two guide plates 2,2 having a funnel-like sectional shape arranged in the closest upper vicinity of the roll for powder compacting 1, and the dam plates 3, 3. The guide plates 2, 2 and the dam plates 3, 3 are arranged oppositely at predetermined intervals. Toward these plates, stop plates for preventing the leakage of powders are each arranged at both ends in the axis line direction of the roll for powder compacting 1. The guide plates 2, 2 are members for smooth introduction of raw powders to the spaces defined by the rolls for powder compacting 1, 1, and the lower ends thereof are arranged closest to the peripheral surfaces of the rolls for powder compacting 1, 1.

To the three space areas defined by the guide plates 2, 2 and the dam plates 3, 3, immediately above the rolls for powder compacting 1, 1, are fed a first powder 4 for the bonding layer, a second powder 5 for the sliding layer, and a third powder 6 for the sacrificial layer, respectively. The first powder 4, the second powder 5, and the third powder 6 come down and enter the space between the rolls for powder compacting 1, 1 in layers, and are continuously pressed (compacted) by the rolls for powder compacting 1, 1 which rotate in the direction so as to bring in the powders with receiving the press load from back-up rolls which are not shown in the drawing, whereby the powders are discharged downward as an aluminum-base composite strip 7 having a three layers structure.

The composite strip 7 is guided by two or more guide rollers 8 and wound up as a coil by a wind-up roll 8A. The coil of the continuous aluminum-base composite strip 7 wound up is subjected to a heat sintering treatment in a furnace for a heat treatment which is not shown in the drawing. The sintering temperature is from 460° C. to 550° C. and is held within the temperature range until the sintering sufficiently proceeds. The temperature-elevating rate to the sintering temperature is from 20 to 50° C./hour for the above reasons, and thus the temperature is gradually raised by heating. The heating furnace is preferably a batch-type furnace. After the temperature of the coil reached the sintering temperature, the coil is held at the temperature for 2 to 16 hours, and after the sintering, it is gradually cooled. The sintered composite strip is trimmed at both side edge sections in the cross-machine direction so as to be in conformity with the width of the steel strip to be used at the rolling-bonding which is a later process.

Figure 3:
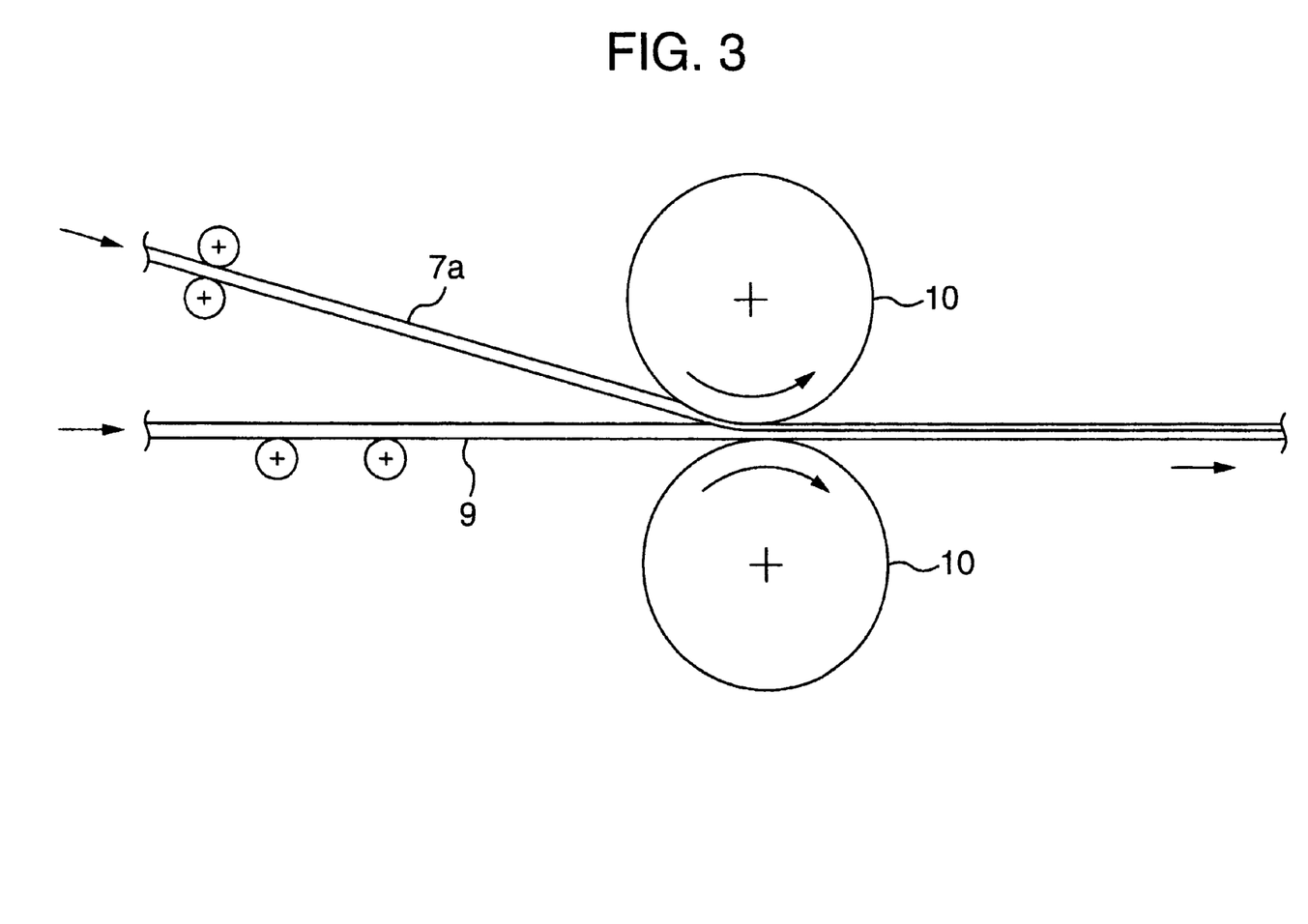
FIG. 3 illustrates a process of continuously rolling-bonding a sintered composite strip to a steel strip in accordance with the invention.

FIG. 3 shows a manner of the rolling-bonding of the sintered composite strip 7a to a steel strip 9 by rolls for rolling 10, 10. A press load is exerted on the rolls for rolling 10, 10 by back-up rolls which are not shown in the drawing. Both of the sintered composite strip 7a and the steel strip (back metal) 9 are continuously fed from a wind-off apparatus which is not shown in the drawing.

The bonding surfaces of the sintered composite strip 7a and the steel strip 9 are ground beforehand to expose fresh surfaces. The aluminum-base composite material having a multi-layered structure obtained by the rolling-bonding is wound up by a wind-up apparatus which is not shown in the drawing.

In order to enhance the bearing performance, the wound aluminum-base composite material is held at a temperature of 400° C. to 510° C. for 0.5 to 10 minutes, and then rapidly cooled down to 300° C. at a cooling rate of at least 50° C./minute. Preferably, prior to the heat and rapid cooling treatment, the material is subjected to a heat treatment at a temperature of 250° C. to 400° C. for relieving work strain of the sintered material layer. In this case, for example, using successive tunnel furnaces, a strain relief annealing heat treatment may be carried out at the first half part, and then, after the elevation of the temperature by heating, rapid cooling may be performed. The strain relief annealing heat treatment is carried out for several minutes to several hours after the temperature of the material has reached a constant temperature. The treating time varies depending on the material composition and the holding time.

Herein below, there will be provided a description of Example and an evaluation thereof.

EXAMPLE

According to the above-mentioned production method, Invention Specimens 1 to 7 and Comparative Specimens 1 to 4 were manufactured. The chemical compositions thereof were shown in Table 1. The thickness of the composite strip having a three layers structure is as follows: Total thickness= 1.8 mm, Bonding layer=about 0.5 mm, Sacrificial layer= about 0.2 mm, and Sliding layer=remainder. For each specimen, a composite strip having a width of 240 mm and a length of 50 m was manufactured. At this stage, the number of fracture times for the composite strip was measured on each specimen.

TABLE 1

| | First group | | | Second group | | | | | | | | | Third group | | |
|---|---|---|---|---|---|---|---|---|---|---|---|---|---|---|---|
| | Pb | Sn | In | Si | Mn | Ni | Cr | Zn | Fe | Zr | Ti | Sb | Cu | Mg | Al |
| Invention specimen | | | | | | Bonding layer | | | | | | | | | |
| 1 | 0.5 | 1 | — | — | — | — | — | — | — | — | — | — | — | — | Bal. |
| 2 | — | 0.4 | — | — | — | — | — | — | — | — | — | — | — | — | " |
| 3 | 1.5 | 3 | 0.5 | 1 | — | 0.2 | 0.3 | — | — | — | 0.2 | 0.3 | 0.8 | 0.2 | " |
| 4 | — | 1 | — | 1 | — | — | — | — | — | — | — | — | — | — | " |
| 5 | — | 1 | — | 1 | 0.5 | — | — | — | — | — | — | — | — | 0.8 | " |
| 6 | — | 1 | — | 1 | — | — | — | 0.5 | 0.5 | 0.2 | — | — | 0.6 | — | " |
| 7 | 0.5 | — | 0.5 | — | — | 0.2 | 0.2 | — | 0.2 | — | 0.2 | 0.8 | — | 0.8 | " |
| Comparative specimen | | | | | | | | | | | | | | | |
| 1 | — | — | — | — | — | — | — | — | — | — | — | — | — | — | " |
| 2-1 | — | 0.3 | — | — | — | — | — | — | — | — | — | — | — | — | " |
| 2-2 | — | 6 | — | — | — | — | — | — | — | — | — | — | — | — | " |
| 2-3 | 5 | 1 | — | — | — | — | — | — | — | — | — | — | — | — | " |
| 3 | 0.3 | — | — | — | — | — | — | — | — | — | — | — | — | — | " |
| 4 | 1.5 | 4 | 0.5 | 1 | — | 0.3 | 0.4 | — | — | — | 0.3 | 0.4 | 1 | 0.2 | " |
| Invention specimen | | | | | | Sliding layer | | | | | | | | | |
| 1 | 8 | 1.5 | — | 4 | — | — | — | — | — | — | — | — | 1 | — | Bal. |
| 2 | 0.5 | 1.5 | — | 2 | — | — | — | — | — | — | — | — | 0.5 | — | " |
| 3 | 15 | 4 | 1 | 6 | — | 0.5 | 0.5 | — | — | — | 0.2 | 0.5 | 1.5 | 0.5 | " |
| 4 | — | 6 | — | 6 | — | — | — | — | — | — | — | — | 0.8 | — | " |
| 5 | — | 6 | — | 6 | 0.5 | — | — | — | — | — | — | — | — | 0.8 | " |
| 6 | — | 10 | — | 6 | — | — | — | 0.5 | 0.5 | 0.5 | — | — | 0.6 | — | " |
| 7 | 5 | — | 5 | — | — | 1 | 1 | — | 1 | — | 0.5 | 3 | — | 2 | " |
| Comparative specimen | | | | | | | | | | | | | | | |
| 1 | 8 | 1.5 | — | 4 | — | — | — | — | — | — | — | — | 1 | — | " |
| 2-1 | 8 | 1.5 | — | 4 | — | — | — | — | — | — | — | — | 1 | — | " |
| 2-2 | 8 | 1.5 | — | 4 | — | — | — | — | — | — | — | — | 1 | — | " |
| 2-3 | 8 | 1.5 | — | 4 | — | — | — | — | — | — | — | — | 1 | — | " |
| 3 | — | 1.5 | — | 1 | — | — | — | — | — | — | — | — | 1 | — | " |
| 4 | 20 | 10 | 1 | 7 | — | 0.7 | 0.7 | — | — | — | 0.3 | 0.8 | 2 | 0.5 | " |
| Invention specimen | | | | | | Sacrificial layer | | | | | | | | | |
| 1 | 12 | 3 | — | — | — | — | — | — | — | — | — | — | — | — | Bal. |
| 2 | 0.4 | — | — | — | — | — | — | — | — | — | — | — | — | — | " |
| 3 | 20 | 4 | 1 | 3 | — | 0.2 | 0.2 | — | — | — | 0.2 | 0.5 | 0.8 | 0.2 | " |
| 4 | — | 5 | — | 1 | — | — | — | — | — | — | — | — | 0.6 | — | " |
| 5 | — | 5 | — | 1 | 0.2 | — | — | — | — | — | — | — | — | 0.6 | " |

TABLE 1-continued

|   | First group | | | Second group | | | | | | | | | Third group | | Al |
|---|---|---|---|---|---|---|---|---|---|---|---|---|---|---|---|
|   | Pb | Sn | In | Si | Mn | Ni | Cr | Zn | Fe | Zr | Ti | Sb | Cu | Mg | |
| 6 | — | 10 | — | 1 | — | — | — | 0.5 | 0.5 | 0.2 | — | — | 0.6 | — | " |
| 7 | 0.5 | — | 10 | — | — | 0.3 | 0.3 | — | 0.3 | — | 0.3 | 1.5 | — | 0.8 | " |
| Comparative specimen | | | | | | | | | | | | | | | |
| 1 | 12 | 3 | — | — | — | — | — | — | — | — | — | — | — | — | " |
| 2-1 | 12 | 3 | — | — | — | — | — | — | — | — | — | — | — | — | " |
| 2-2 | 12 | 3 | — | — | — | — | — | — | — | — | — | — | — | — | " |
| 2-3 | 12 | 3 | — | — | — | — | — | — | — | — | — | — | — | — | " |
| 3 | 0.3 | — | — | — | — | — | — | — | — | — | — | — | — | — | " |
| 4 | 25 | 5 | 1 | 4 | — | 1 | 1 | — | — | — | 0.5 | 1 | 1 | 0.5 | " |

* Note:
Bal. = balance

Next, for sintering, each specimen was heated at a temperature-elevating rate of 50° C./hour and held at a temperature of 535° C. for 15 hours. Cooling was carried out at a cooling rate of 50° C./hour. Then, on coil-shaped each specimen, both surfaces were observed to determine the occurrence of blisters having a diameter of at least 3 mm. Table 4 shows the number of blisters formed per 1 m of unit length.

Furthermore, for each sample, both side edge sections of the sintered composite strip having a width of 240 mm were trimmed to make the width 200 mm. The samples broken at that time was connected with an adhesive tape to form again a continuous strip.

On the other hand, a steel strip coil for back metal having a width almost the same as the width of the sintered composite strip and a thickness of 1.3 mm was prepared and the sintered composite strip and the steel strip coil were rolling-bonded in a manner shown in FIG. 3. At that time, immediately before the bonding, the bonding surfaces of both materials were roughened by means of a wire brush or a belt grinding apparatus, which is not shown in the drawing, to expose fresh surfaces.

The conditions for the rolling-bonding were as follows: a diameter of the lower roll=400 mmϕ, a diameter of the upper roll=80 mmϕ (the upper roll contacts with the sintered composite strip), and a line speed=10 m/minute (at the roll exit side).

The aluminum-base composite material which is a multi-layered composite material obtained by the rolling-bonding was wound up by means of a wind-up apparatus.

The thickness of each sample after the rolling-bonding was as follows: a total thickness=1.8 mm, and a thickness of the steel strip=0.90 to 1.10 mm.

Additionally, the number of fracture times for the sintered composite strip was measured for the length of 50 m. The places connected with an adhesive tape were also counted as the number of fracture times.

The wound aluminum-base composite material was subjected to an annealing treatment of heating at 300° C. for 10 hours in order to remove processing strain at the rolling-bonding.

Figure 4:
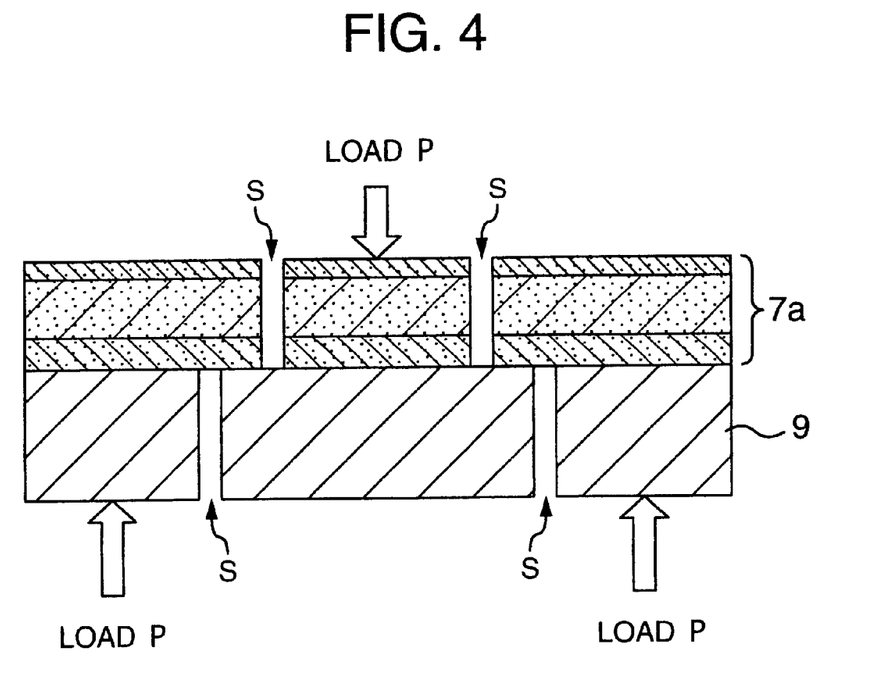
FIG. 4 illustrates a test method for the bonding strength between a sintered composite strip and a steel strip which are bonded with each other by rolling.

Thereafter, in order to examine the bonding strength between the sintered composite strip and the steel strip, the bonding strength was measured by the edge-cutting method shown in FIG. 4. Namely, as shown in FIG. 4, using a tensile tester, the aluminum-base composite material was formed as a flat body and a test piece was prepared by forming slits S from the steel strip 9 side and the sintered material 7a side, and then, the bonding strength was measured by exerting press loads P onto arrowed positions.

Furthermore, on each specimen, after it was formed to a bush shape whose inner surface is a sliding surface, the sacrificial layer was removed by machining the inner surface by 300 μm and then, the friction-wear test was carried out.

The seizure test for examining anti-seizure property was carried out under the test conditions shown in Table 2. In the seizure test results, the load before exerting a load at which seizure occurred was determined as critical seizure load.

Additionally, the wear test was carried out under the test conditions shown in the FIG. 3. For the measurement of abrasion amount, the wall thickness before and after the test was measured and the difference was determined as abrasion amount.

TABLE 2

(Conditions of Seizure test)

| | |
|---|---|
| Sample shape | Inner diameter = 50 mmϕ, Width = 10 mm (inner sliding surface) |
| Associated shaft | JIS S45C induction quenching, HRC 55, 0.2 Ra |
| Sliding speed | 5 m/second |
| Lubricant | ATF oil, Housing lubrication |
| Load | Cumulative loading method, increased by 2 MPa every 5 minutes |
| Seizure standard | Rapid elevation of the temperature at the back surface of bearing, Overload of motor |

TABLE 3

(Wear test)

| | |
|---|---|
| Sample shape | Inner diameter = 20 mmϕ, Width = 15 mm (inner sliding surface) |
| Associated shaft | JIS S45C induction quenching, HRC 55, 0.2 Ra |
| Sliding speed | 4.2 m/second |
| Cycle pattern | Reduction and acceleration of the speed: 2 seconds each, Holding: 1 second, Total: 6 seconds/cycle |

TABLE 3-continued (Wear test)

| | |
|---|---|
| Test time | 5 hours (3000 cycles) |
| Lubricant | ATF oil 120° C. in oil bath |
| Load | 12.5 MPa |

The components lists and the evaluation results of these samples are shown in Tables 1 and 4. In the column of overall evaluation in Table 4, overall evaluation results of the material performance (productivity, properties) from production process to property test results were shown by the following symbols: A (excellent), B (good), C (no good), and D (improper). The overall evaluation results of Comparative Specimens 1, 2-1, 2-2, 2-3, 3, and 4 are all D (improper) or C (no good).

TABLE 4

| | Sintered composite strip | Frequency of blister occurence blisters/m | Number of fracture times at rolling | Bonding strength at steel interface MPa | Anti-seizure property Critical seizure load MPa | Wear resistance property Abrasion amount (μm) | Overall evaluation |
|---|---|---|---|---|---|---|---|
| Invention specimen | | | | | | | |
| 1 | — | 1 | — | 1.05 | 32 | 32 | A |
| 2 | — | 3 | — | 1.12 | 22 | 45 | B |
| 3 | 2 | — | 5 | 0.68 | 36 | 18 | B |
| 4 | — | 1 | — | 1.10 | 30 | 33 | A |
| 5 | 1 | 1 | 2 | 1.08 | 30 | 28 | B |
| 6 | 1 | 1 | 2 | 0.93 | 32 | 20 | B |
| 7 | 2 | — | 4 | 0.87 | 38 | 23 | B |
| Comparative specimen | | | | | | | |
| 1 | — | 20 | — | 1.30 | 32 | 32 | D |
| 2-1 | — | 9 | — | 1.15 | 32 | 31 | C |
| 2-2 | — | — | — | 0.28 | 31 | 32 | D |
| 2-3 | — | — | — | 0.19 | 30 | 32 | D |
| 3 | — | 8 | — | 1.12 | 14 | 60 | C |
| 4 | 10 | — | 13 | 0.35 | 34 | 19 | D |

Invention Specimen 2 is a sample having a lower limit of the composition range of each material component defined by the invention. Invention Specimen 3 is a sample having an upper limit of the composition range of each material component defined by the invention. Both of Inventive Specimens 2 and 3 have good productivity and bearing properties.

Moreover, in comparison of Invention Specimen 1 with Comparative Specimen 1, the effect of reducing the blister occurrence by the invention is evident.

Comparative Specimens 2-1 to 2-3 are materials wherein the component compositions of the sliding layer and the sacrificial layer are the same and only the composition of the bonding layer is different from each other as is apparent from Table 1, and the contents of the first element group are all out of the upper or lower limit of the composition range defined by the invention. These Comparative Specimens clarify the problems in the production (Table 4). The bonding strength of the sintered material to the steel strip strongly correlates to the fatigue strength of the bearing, so that the material having a small bonding strength results in the generation of peeling-off or crack during the use as a bearing and thus, the material becomes impossible to use.

Next, for each of Invention Specimens 1 to 7 after annealing, the coil of the aluminum-base composite material was set on an uncoiling apparatus (recoiler), passed through a continuous heating furnace held at a constant temperature of 500° C. under a nitrogen atmosphere, and again wound up as a coil. Furthermore, in the furnace near to the exit, the uncoiled material was rapidly cooled down by blowing nitrogen gas having a temperature of 10° C. onto the surface of the sintered material side at an injection rate of 20 m³/minute. Moreover, when the actual temperature data was measured by attaching a thermocouple to the sintered material side, the temperature was held at 480° C. for 90 seconds and then cooled down to 300° C. at a cooling rate of 30° C./minute.

For each rapidly cooled sample, in a similar manner to the method described in the above seizure test and wear test, after it was formed to a bush shape whose inner surface is a sliding surface, the sacrificial layer was removed by machining the inner surface by 300 μm and then, the friction-wear test was carried out. The test results are shown in Table 5 (in the table, Specimens 1 to 7 means Invention Specimens 1 to 7).

TABLE 5

(Properties of Invention Specimens (after heat treatment))

| | Anti-seizure property Critical seizure load (MPa) without heat treatment | Anti-seizure property Critical seizure load (MPa) with heat treatment | Wear resistance Abrasion amount (μm) without treatment | Wear resistance Abrasion amount (μm) with heat treatment |
|---|---|---|---|---|
| Specimen 1 | 32 | 39 | 32 | 15 |
| Specimen 2 | 22 | 24 | 45 | 30 |
| Specimen 3 | 36 | 45 | 18 | 4 |
| Specimen 4 | 30 | 34 | 33 | 12 |
| Specimen 5 | 30 | 36 | 28 | 10 |

TABLE 5-continued (Properties of Invention Specimens (after heat treatment))

| | Anti-seizure property Critical seizure load (MPa) without heat treatment | Anti-seizure property Critical seizure load (MPa) with heat treatment | Wear resistance Abrasion amount (μm) without heat treatment | Wear resistance Abrasion amount (μm) with heat treatment |
|---|---|---|---|---|
| Specimen 6 | 32 | 40 | 20 | 7 |
| Specimen 7 | 21 | 22 | 23 | 5 |

By subjecting Invention Specimens 1 to 7 to the heat treatment, the hardness (Hv) enhances by about 4 to 10, and, as a result, wear resistance property was improved to a large extent in all Specimens (see Table 5). In particular, the effect is remarkable in Specimens containing a large amount of Cu or Mg (Invention Specimens 3 and 7).

The effect of the heat treatment is also evident in the enhancement of anti-seizure property. Particularly, in the samples containing a large amount of Si, good results are obtained among Inventive Specimens because of the effect of scratching off adhered matters on the surface of the associated shaft by Si particles having a particle size of several Am crystallized in the aluminum base and the effect of improving anti-seizure property because Si particles themselves are difficult to react with the associated shaft material. When these samples are subjected to the heat treatment to improve the base hardness, the Si particles exposed on the surface of the sliding layer becomes hard to move from the surface layer into the inside of the sliding layer, and therefore, the particles becomes difficult to embed, so that anti-seizure effect is further enhanced (Invention Specimens 3 and 6).

As will be apparent from the above description of the Example, according to the production method of the invention as defined in the claims using aluminum-base powders, the occurrence of blisters which is a problem of the conventional technology in the production process dramatically decreases, and bearing performance is also improved to a large extent. In addition, when the aluminum-base composite material is subjected to a heat treatment as a final treatment, bearing performance is further improved.

What is claimed is:

1. A method of producing an aluminum-base composite bearing material made by powder sintering, wherein the aluminum-base composite bearing material consists of an aluminum-base metallic layer made by powder sintering and a back metal, wherein the aluminum-base metallic layer consists of a bonding layer, a sliding layer and a sacrificial layer which are arranged in this order, wherein the aluminum-base metallic layer is bonded by rolling to the back metal at the side of the bonding layer, and wherein the method comprises the steps of:

(a) preparing a first powder to be formed to the bonding layer, which consists of 0.4 to 5 mass % in total of at least one selected from a first element group of Sn, In and Pb, from zero to 2 mass % in total of at least one selected from a second element group of Si, Mn, Ni, Cr, Zn, Fe, Zr, Ti and Sb, from zero to 1 mass % in total of at least one selected from a third element group of Cu and Mg, and the balance of Al and incidental impurities;

(b) preparing a second powder to be formed to the sliding layer, which consists of 2 to 20 mass % in total of at least one selected from the first element group, 2 to 8 mass % in total of at least one selected from the second element group, 0.5 to 2 mass % in total of at least one selected from the third element group, and the balance of Al and incidental impurities;

(c) preparing a third powder to be formed to the sacrificial layer, which consists of 0.4 to 25 mass % in total of at least one selected from the first element group, from zero to 4 mass % in total of at least one selected from the second element group, from zero to 1 mass % in total of at least one selected from the third element group, and the balance of Al and incidental impurities;

(d) continuously forming an elongated multi-layered body of three powder layers so that the second powder is positioned between the first and second powders, whereby obtaining a first to third powder layers;

(e) continuously forming a composite strip of compacted powders, which has a three layers structure, by continuously feeding the elongated multi-layered body into a rolling machine for powder compacting to press and form it;

(f) producing a sintered composite strip by heating the continuous composite strip of compacted powders to a temperature of 460° C. to 550° C. to continuously sinter it;

(g) continuously laying the sintered composite strip on a steel strip to be the back metal, which is fed separately, so as to bring the first powder layer side of the sintered composite strip to contact with the steel strip, and feeding the combined strips into a rolling machine to continuously rolling-bond the sintered composite strip to the steel strip; and (h) subjecting the thus obtained rolling-bonded composite strip to a heat treatment of heating it to a temperature of 400° C. to 510° C. and holding it under the temperature for not less than 30 seconds, and of rapidly cooling it down to 300° C. at a cooling rate of not lower than 50° C./minute, whereby obtaining a multi-layered composite material having a layered structure consisting of the back metal of the steel strip, the bonding layer of the sintered first powder layer, the sliding layer of the sintered second powder layer, and the sacrificial layer of the sintered third powder layer which are arranged in this order.

2. A method according to claim 1, wherein the rolling-bonded composite strip is subjected to a heat treatment at a temperature of 250° C. to 400° C. prior to the step (h).

3. A method according to claim 2, wherein the temperature-elevating rate of the continuous composite strip of compacted powders to a temperature of 460° C. to 550° C. in the step (f) is from 20° C. to 50° C./hour and the holding time at the elevated temperature is from 2 to 16 hours.

4. A method according to claim 2, wherein the composite strip of compacted powders having a three layers structure, which is produced in the step (e), has a total thickness of 1200 to 2500 μm, and wherein the first powder layer to be formed to the bonding layer has a thickness of 300 to 600 μm, the third powder layer to be formed to the sacrificial layer has a thickness of 100 to 300 μm, and the second powder layer to be formed to the sliding layer has the remainder thickness.

5. A method according to claim 1, wherein the temperature-elevating rate of the continuous composite strip of compacted powders to a temperature of 460° C. to 550° C. in the step (f) is from 20° C. to 50° C./hour and the holding time at the elevated temperature is from 2 to 16 hours.

6. A method according to claim 5, wherein the composite strip of compacted powders having a three layers structure, which is produced in the step (e), has a total thickness of 1200 to 2500 μm, and wherein the first powder layer to be formed to the bonding layer has a thickness of 300 to 600 μm, the third powder layer to be formed to the sacrificial layer has a thickness of 100 to 300 μm, and the second powder layer to be formed to the sliding layer has the remainder thickness.

7. A method according to claim 1, wherein the composite strip of compacted powders having a three layers structure, which is produced in the step (e), has a total thickness of 1200 to 2500 μm, and wherein the first powder layer to be formed to the bonding layer has a thickness of 300 to 600 μm, the third powder layer to be formed to the sacrificial layer has a thickness of 100 to 300 μm, and the second powder layer to be formed to the sliding layer has the remainder thickness.

8. An aluminum-base composite bearing material made by powder sintering, wherein the sacrificial layer of the aluminum-base composite bearing material as defined in claim 7 is removed by machining.

9. An aluminum-base composite bearing material made by powder sintering, which consists of an aluminum-base metallic layer made by powder sintering and a back metal, wherein the aluminum-base metallic layer consists of a bonding layer, a sliding layer and a sacrificial layer which are arranged in this order, wherein the aluminum-base metallic layer is bonded by rolling to a steel strip as the back metal at the side of the bonding layer, (a) the bonding layer being a sintered powder layer consisting of 0.4 to 5 mass % in total of at least one selected from a first element group of Sn, In and Pb, from zero to 2 mass % in total of at least one selected from a second element group of Si, Mn, Ni, Cr, Zn, Fe, Zr, Ti and Sb, from zero to 1 mass % in total of at least one selected from a third element group of Cu and Mg, and the balance of Al and incidental impurities;

(b) the sliding layer being a sintered powder layer consisting of 2 to 20 mass % in total of at least one selected from the first element group, 2 to 8 mass % in total of at least one selected from the second element group, 0.5 to 2 mass % in total of at least one selected from the third element group, and the balance of Al and incidental impurities; and (c) the sacrificial layer being a sintered powder layer consisting of 0.4 to 25 mass % in total of at least one selected from the first element group, from zero to 4 mass % in total of at least one selected from the second element group, from zero to 1 mass % in total of at least one selected from the third element group, and the balance of Al and incidental impurities, and wherein the aluminum-base metallic layer consisting of the bonding layer, the sliding layer and the sacrificial layer is a sintered composite strip which is formed prior to the rolling-bonding to the steel strip, and the aluminum-base composite bearing material is, as a whole, subjected to a heat treatment after the sintered composite strip is bonded by rolling to the steel strip.

* * * * *